United States Patent [19]

Giesfeldt et al.

[11] Patent Number: 4,994,115
[45] Date of Patent: Feb. 19, 1991

[54] PROCESS FOR PRODUCING A HIGH TOTAL DIETARY CORN FIBER

[75] Inventors: J. E. Todd Giesfeldt, La Grange; Robert J. Repta, Orland Park; Irving F. Deaton, Wheaton, all of Ill.

[73] Assignee: CPC International Inc., Englewood Cliffs, N.J.

[21] Appl. No.: 211,188

[22] Filed: Jun. 23, 1988

[51] Int. Cl.$^5$ .................. A23L 1/10; C08R 30/02
[52] U.S. Cl. .................................. 127/67; 127/69; 426/481; 426/482; 241/7; 241/9; 241/12
[58] Field of Search ............... 426/481, 482; 127/67, 127/69; 241/7, 9, 12

[56] References Cited

U.S. PATENT DOCUMENTS

| | | | |
|---|---|---|---|
| 2,772,990 | 12/1956 | Hage | 127/67 |
| 2,913,112 | 11/1959 | Stavenger et al. | 209/211 |
| 3,813,298 | 5/1974 | Chwalek | 127/69 |
| 4,144,087 | 3/1979 | Chwalek et al. | 127/67 |
| 4,181,534 | 1/1980 | Headley | 127/67 |
| 4,181,747 | 1/1980 | Kickle et al. | 476/615 |
| 4,565,702 | 1/1986 | Morley et al. | 426/93 |
| 4,757,948 | 7/1988 | Nonaka et al. | 241/7 |

FOREIGN PATENT DOCUMENTS 0166824 1/1986 European Pat. Off. .
0194060 9/1986 European Pat. Off. .

OTHER PUBLICATIONS

Watson, Manufacture of Corn and Milo Starches, Ch. 1, pp. 1-51, *Starch Chemistry and Technology*, Whistler an Paschall eds., vol. II, Academic Press, 1967.
Patent Abstracts of Japan, vol. 12, No. 372 (C-533) (3219) 5, Oct. 1988.
J. L. Vetter, "Fiber as a Food Ingredient", Food Technology, vol. 1, Jan. 1984, pp. 64-65 & 68-69.

*Primary Examiner*—Chung K. Pak
*Attorney, Agent, or Firm*—Rockey and Rifkin

[57] ABSTRACT

A process for producing corn fiber having a high total dietary fiber content. A dilute aqueous slurry of the corn fiber obtained from the corn wet-millng process is separated by means of a hydroclone to give a fiber fraction of enhanced total dietary fiber content. This fiber fraction may then be passed into a centrifual paddle screen to give a product of even higher total dietary fiber content.

5 Claims, No Drawings

PROCESS FOR PRODUCING A HIGH TOTAL DIETARY CORN FIBER

FIELD OF THE INVENTION

This invention relates to a method wherein the mixed fiber stream obtained from the corn wet-milling process is processed to give a product having a high total dietary fiber content.

BACKGROUND OF THE INVENTION

In recent years, there has been an increasing awareness of the role that fiber plays in the human diet. This stems not only from the role that fiber plays as a bulking agent, but also from the role it is believed to play in preventing diseases of the gastrointestinal tract.

The dietary fiber from wheat, wheat bran, has been consumed in breakfast cereals, whole wheat breads, and similar products for many years. However, there is a recognized need for larger amounts of fiber to supplement processed foods which are now eaten by a large proportion of the population. For these reasons, food suppliers have sought additional sources of dietary fiber.

One potential source of dietary fiber is the corn fiber obtained as a by-product of the wet milling of corn. However, this product contains fairly high percentages of starch and protein. Such additional components make the fiber less suitable for use in baking and other food applications. This has led workers to look for an economical and commercially acceptable process to reduce the amount of starch and protein while increasing the dietary fiber content of the fiber obtained from the corn wet-milling process.

In U.S. Pat. No. 4,181,534, one process is disclosed for treating the wet fiber stream obtained from the corn wet-milling process. According to this process, the fiber stream, while still wet, is abraded by means of a beater or impact mill. The milled product is then separated into fractions with one fraction being an enriched fiber containing a high proportion of pentosans.

In U.S. Pat. No. 4,181,747, a second process is disclosed for enriching the fiber obtained from corn and soybeans. In this process, the crude fiber is heated with dilute aqueous acid to hydrolyze and dissolve undesired by-products. The material is then washed extensively in order to obtain a fiber of higher dietary fiber content.

Although these prior processes can give an enriched fiber product, there is still need for a simple low-cost process for producing a product of dietary fiber content from corn. We have now discovered a simple and economical process for enriching the dietary fiber content of corn fiber without the need for a chemical hydrolysis or for an expensive milling operation. By this process, the corn wet miller can convert in a continuous process a low-value by-product to a food component of much higher value.

SUMMARY OF THE INVENTION

In accordance with this invention, there is provided a process for producing a corn fiber product having a high dietary fiber content which comprises:

(a) diluting crude fiber obtained from the corn wet-milling process with water to give an aqueous slurry of crude corn fiber with a solids concentration of from about 2% to about 5% by weight;

(b) passing said aqueous slurry of crude corn fiber through a hydroclone with the operating pressure of said hydroclone adjusted so that from about 65% to about 75% of the volume of the aqueous slurry entering the hydroclone exits in the overflow stream of the hydroclone; and (c) separating a corn fiber of high dietary fiber content from said overflow stream.

Also provided, in accordance with this invention, is a continuous process for producing a corn fiber product having a high dietary fiber content which comprises:

(a) diluting crude fiber obtained from the corn wet-milling process with water to give an aqueous slurry of crude corn fiber with a solids concentration of from about 2% to about 5% by weight;

(b) passing said aqueous slurry of crude corn fiber through a hydroclone with the operating pressure of said hydroclone adjusted so that from about 65% to about 75% of the volume of the aqueous slurry entering the hydroclone exits in the overflow stream from the hydroclone;

(c) passing said overflow stream from the hydroclone into a centrifugal paddle screen having screen openings of from about 2 mm to about 4 mm, and clearance between the screen and the paddles from about 6 mm to about 15 mm; and (d) washing the solid separated by the centrifugal paddle screen to give a corn fiber fraction of high dietary fiber content.

DETAILED DESCRIPTION OF THE INVENTION

The starting material used in the process of this invention is the crude mixed fiber stream obtained from the corn wet-milling process. This is readily available raw material produced in large quantities as a by-product of starch production by the wet milling of corn. For a discussion of the industrial corn wet-milling process, see *Starch Chemistry and Technology*, Whistler and Paschall, Editors, Vol. II, Chapter 1, pp. 1–51, Academic Press, N.Y. (1967). The fiber produced by this process is washed and squeezed or filtered to reduce the content of free moisture to about 50% to 60% by weight. In the past, this by-product has generally been mixed with other by-products of the milling process and dried for use as animal feed.

The undried mixed fiber stream, having a moisture content of from about 80% to about 90% by weight, is diluted with water to give a slurry with a solids content of from about 2% to about 5% by weight. This aqueous slurry is then used in the process of this invention.

The dilute aqueous slurry of corn fiber is then passed through a hydroclone. Hydroclones suitable for use in the process of this invention are well-known items of commerce. A particularly suitable hydroclone is one available from the Dorr-Oliver Company, Stamford, Conn., which has a diameter of about 6 inches at the top of its 3-foot length. Such a hydroclone is described in detail in U.S. Pat. No. 2,913,112. It has been used for many years in the corn wet-milling industry for the aqueous separation of germ from corn, and its structure is described in detail in the chapter from *Starch Chemistry and Technology* cited above. As noted in that article, batteries of the hydroclones may be operated in parallel when it is desired to separate large volumes of material.

In the process of this invention, the rate of flow of the aqueous slurry of crude corn fiber into the hydroclone and the pressure drop across the hydroclone are so adjusted that from about 65% to about 75% of the volume of the aqueous slurry entering the hydroclone exits in the overflow stream of the hydroclone. Under these conditions, the pressure drop across the hydroclone is usually between about 8 and 12 psi (0.56–0.9 kg/cm$^2$). The underflow, which contains a larger concentration of starch and protein along with some fiber, is returned to the corn wet-milling process where it is combined with the normal by-products of the process.

The overflow stream from the hydroclone contains coarse solid material which has a much higher dietary fiber content than does the material which passes in the underflow stream of the hydroclone. This coarse material is then collected and washed on a screen or other device which permits removal of finely-divided material. The product obtained in this step generally has a total dietary fiber content of from about 60% to about 85%.

In order to produce a product of even higher total dietary fiber content, the overflow stream from the hydroclone is passed into a centrifugal paddle screen where the fiber is further purified giving a product having greater than about 90% total dietary fiber on a dry substance basis.

Various known centrifugal screening devices capable of continuously separating solids and liquids can be employed in this process. Generally, such devices comprise a cylindrical screen, means for imparting centrifugal force to a slurry, and means for removing separated solids from the screen. In a large volume industrial process, a commercially-available centrifugal paddle screen is most suitable.

A convenient paddle screen for this process is the Indiana Canning Machine, Model No. 77, obtained from the Indiana Canning Machine Company, Indianapolis, Ind. It is fitted with a screen having openings between about 2 mm and about 4 mm, preferably about 3 mm in diameter. The clearance between the screen and the paddles is between about 6 mm and 15 mm, preferably between about 7 mm and 11 mm. Suitable operating speeds are between about 500 and 1000 revolutions per minute (rpm).

The solid separated by the centrifugal paddle screen is then washed and dried. The washing step is conveniently carried out on a screen bend or on a second centrifugal paddle screen. If a second centrifugal paddle screen is used, the total dietary fiber content of the product is further increased by 2% to 3%. Dried material may be ground to any desired size depending on the end use of the product.

The product obtained by this process has a light color, has a bland taste, and is suitable for use in a variety of food products. Thus, a continuous process has been developed, which is applicable to a large-scale production of a food-grade fiber having a high dietary fiber content which can be prepared from a readily available starting material.

The following examples further illustrate the present invention and will enable others skilled in the art to understand it more completely. It should be understood, however, that the invention is not limited solely to the examples given below. In the examples, all percentages given are on a weight basis unless otherwise indicated. The total dietary fiber values were determined by the method of Prosky, et al, *J. Assoc. Off. Anal. Chem.*, 67, 1044–1051 (1984). They represent the material remaining after the removal of starch, protein, fat, and ash from a given sample.

EXAMPLE 1

Separate portions of a 10–20% solids fiber stream, obtained during wet milling of corn, were used in the runs described in this example. The fiber stream was diluted with water to give a slurry with a solids concentration of about 2.25% by weight. The dilute aqueous slurry of crude corn fiber was then passed through a 6-inch (15.24-cm) diameter hydroclone (DorrClone, Dorr-Oliver Company) at a supply rate of about 190 liters per minute. The pressure drop across the hydroclone was 8 psi (0.56 kg/cm$^2$). The volume ratio of the overflow stream to the supply stream was 0.71. The overflow stream was then pumped through a centrifugal paddle screen (Indiana Canning Machine Company, Model No. 77), fitted with a screen having 3.2-mm diameter openings and with a 9.5-mm gap between the paddles and the screen. The machine was operated at a speed of 600 rpm. The dietary fiber which collected on the screen was washed, dried, and analyzed. The results of two runs are given in Table I. They demonstrate that when the crude fiber stream from the corn wet-milling process is subjected to the process of this invention, a dietary fiber fraction is obtained which has a dietary fiber content greater than 90%.

TABLE I

|  | Yield (% of Original TDF) | TDF[a] (% d.b.[b]) | Starch (% d.b.) | Protein (% d.b.) | Fat (% d.b.) |
|---|---|---|---|---|---|
| Starting Material |  | 46.9 | 30.1 | 16.0 | 1.8 |
| Product |  |  |  |  |  |
| Run 1 | 6.5 | 91.4 | 4.8 | 5.1 | 1.8 |
| Run 2 | 4.4 | 92.5 | 5.7 | 5.0 | 2.1 |

[a]TDF = Total Dietary Fiber
[b]d.b. = dry basis

EXAMPLE 2

The general procedure of Example 1 was followed except that the water used for dilution of the crude fiber was process water from the corn wet-milling process. In Runs 3, 4, and 5, the gap between the paddles and the screen in the paddle-screen apparatus was changed to show the influence of this gap on the quality of the product. In Runs 6–11, the dietary fiber slurry washed from the screen of the first paddle screen was passed into a second paddle screen before the product was isolated. The results of these runs are given in Table II. Runs 3–5 demonstrate that as the gap between the paddle and the screen in the paddle screen is reduced, the percentage of total dietary fiber in the product increases. Runs 7–11, which all employed a gap between the paddle and the screen like that of Run 4, demonstrate that passage of the dietary fiber through a second paddle screen gives a product with a somewhat higher dietary fiber content than does the process using the same conditions which includes only one pass through a paddle screen.

TABLE II

| Run | Yield (% of Original TDF[a]) | TDF (% d.b.[b]) |
|---|---|---|
| 3[c] | — | 89.5 |
| 4 | 5.6 | 91.1 |
| 5[c] | 4.7 | 94.4 |
| 6 | — | 93.4[d] |

TABLE II-continued

| Run | Yield (% of Original TDF[a]) | TDF (% d.b.[b]) |
|---|---|---|
| 7 | 4.0 | 93.8 |
| 8 | 5.0 | 93.1 |
| 9 | 7.0 | 92.8 |
| 10 | 5.2 | 92.2 |
| 11 | 7.8 | 92.1 |

[a]TDF = Total Dietary Fiber
[b]d.b. = dry basis
[c]In Runs 3 and 5, the gap between the paddles and screen was 13 mm and 6.4 mm, respectively. In all other runs, the gap was 9.5 mm.
[d]Average of five batch washes. Runs 7-11 were washed continuously on the paddle screen.

EXAMPLE 3

A crude corn fiber stream as in Example 1 was diluted with water to give a slurry with a solids concentration of about 2% by weight. The dilute aqueous slurry of crude corn fiber was then passed through the hydroclone as in Example 1. In the various runs, the pressure drop across the hydroclone was between 0.7 and 0.9 kg/cm$^2$. The volume ratio of the overflow stream to the supply stream was about 0.65. The results of four runs are given in Table III.

TABLE III

| Run | Yield (% of Original TDF[a]) | TDF (% d.b.[b]) |
|---|---|---|
| 12 | 6.5 | 85.6 |
| 13 | 9.4 | 81.7 |
| 14 | 6.6 | 84.1 |
| 15 | 3.6 | 84.3 |

[a]TDF = Total Dietary Fiber
[b]d.b. = dry basis

Thus, it is apparent that there has been provided, in accordance with the invention, a process for producing a high total dietary corn fiber that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A continuous process for producing a corn fiber product having a high dietary fiber content which comprises:
    (a) diluting crude fiber obtained from the corn wet-milling process with water to give an aqueous slurry of crude corn fiber with a solids concentration of from about 2% to about 5% by weight;
    (b) passing said aqueous slurry of crude corn fiber through a hydroclone with the operating pressure of said hydroclone adjusted so that from about 65% to about 75% of the volume of the aqueous slurry entering the hydroclone exits in the overflow stream from the hydroclone;
    (c) passing said overflow stream from the hydroclone into a centrifugal paddle screen having screen openings of from about 2 mm to about 4 mm, and clearance between the screen and the paddles from about 6 mm to about 15 mm; and
    (d) washing the solid separated by the centrifugal paddle screen to give a corn fiber fraction of high dietary fiber content.

2. The process of claim 1 wherein the operating pressure of the hydroclone used in Step (b) is adjusted so that the pressure drop across the hydroclone is between about 0.56 kg/cm$^2$ and 0.9 kg/cm$^2$.

3. The process of claim 1 wherein the screen openings of the centrifugal paddle screen used in Step (c) are about 3 mm.

4. The process of claim 1 wherein the clearance between the screen and the paddles of the centrifugal paddle screen used in Step (c) is between about 7 mm and 11 mm.

5. The process of claim 1, wherein the solid separated by the centrifugal paddle screen in step (c) is washed in a second centrifugal paddle screen in step (d).

* * * * *